United States Patent
Begg

(10) Patent No.: US 7,311,084 B2
(45) Date of Patent: Dec. 25, 2007

(54) FUEL INJECTION SYSTEM

(76) Inventor: Angus Barry Begg, 940 Cauthen Ct. NE., Marietta, GA (US) 30066-3203

( * ) Notice: Subject to any disclaimer, the term of this patent is extended or adjusted under 35 U.S.C. 154(b) by 73 days.

(21) Appl. No.: 11/342,054

(22) Filed: Jan. 27, 2006

(65) Prior Publication Data

US 2007/0175447 A1    Aug. 2, 2007

(51) Int. Cl.
*F02M 51/00*    (2006.01)

(52) U.S. Cl. ...................... 123/476; 123/494

(58) Field of Classification Search ............... 123/476, 123/494, 179.28, 179.29, 185.2; 701/115; 73/514.16, 514.31
See application file for complete search history.

(56) References Cited

U.S. PATENT DOCUMENTS

| | | | | |
|---|---|---|---|---|
| 6,791,225 | B2 | 9/2004 | Campbell et al. | 310/181 |
| 6,826,896 | B1 | 12/2004 | Liao | 56/17.5 |
| 2005/0098663 | A1 | 5/2005 | Ishii | 239/584 |
| 2005/0103881 | A1 | 5/2005 | Harcombe | 239/88 |
| 2005/0109320 | A1 | 5/2005 | Mashiki | 133/431 |
| 2005/0124460 | A1 | 6/2005 | Iriyama | 477/107 |

OTHER PUBLICATIONS

"RC Fuel Injection, Technical Information," Internet article, pp. 1-5 on http:www.rceng.com/technical.htm, Jun. 16, 2005, RC Engineering.
"How Fuel Injection Systems Work," Internet article, pp. 1-2 on http://auto.howstuffworks.com/fuel-injection2.htm, Jul. 12, 2005, How Stuff Works.
"Magnetic Proximity Sensors," Internet article, pp. 1-2 on http://www.cherrycorp.com/english/sensors/mp1013.htm, Oct. 20, 2005, Cherry Corporation #102 Pleasant Prairie. WI 5315.
"How Car Engines Work," Internet article, pp. 1-16 on http://www.howstuffworks.com/engine.htm/printable, Jan. 27, 2006, How Stuff Works.

*Primary Examiner*—Hai Huynh

(57) ABSTRACT

This invention provides a simple means to initiate the movement of a vehicle by utilizing a fuel injector system, which determines a length of a magnet on the flywheel or crankshaft pulley. This system enables a person to choose a speed where fuel from a fuel injector can be efficiently dispersed into an engine. The engine's fuel efficiency is optimized by this invention, because only a specific amount of fuel will be dispersed to generate electricity to operate the engine, which prevents the engine from needlessly expending energy.

19 Claims, 7 Drawing Sheets

FUEL INJECTION SYSTEM

FIELD OF INVENTION

This invention relates to a fuel injector system that efficiently provides fuel to the engine.

BACKGROUND OF THE INVENTION

Generally, when people travel from one city to another city or from one country to another they utilize some mode of transportation, such as an airplane, car, ship or train. Each of the aforementioned modes of transportation includes an engine. Some of the engines for these modes of transportations are large and some are smaller. The smaller engines used in cars or smaller electronic devices, such as lawn mowers with two-stroke engines or four-stroke engines. The engines are smaller for these devices because lawn mowers do not require much electricity and gas to operate.

Typically, a lawn mower utilizes a two-stroke engine that includes a magneto to produce alternating current for distribution to spark plugs that are utilized to excite an engine to make it operate. A conventional flywheel magneto generator includes a rotor assembly and a stator assembly. The rotor assembly has a flywheel and a plurality of poles disposed around the peripheral wall of the flywheel. Permanent magnets are secured by bolts to the poles. A stator assembly confronts the permanent magnets on the rotor to generate electrical energy. The aforementioned system was known to result in large eddy current losses with resultant heat generation in the poles. Thus, the aforementioned engines were able to produce electricity to operate the lawn mower, but they also lost electricity because they generated large eddy current losses causing the lawn mower to overheat and needlessly expend energy.

In previous flywheel magneto generators, a single magnet is mounted on the flywheel and the flux of the magnet is brought out to the working radius of the flywheel by pole shoes that are made of a magnetically conductive material. The stator assembly is typically a U-shaped core that is made of a magnetically conductive material. The ends of the core are positioned close to the path of the poles' shoes on the flywheel. The magnet on the rotating flywheel produces a magnetic field through a permeability path provided by the stator assembly. One or more coils are wrapped around the core. When the flux passes through the core, a voltage is generated with the coils. This voltage may be stored or used to start an engine. This prior art system was not optimized since flux was generated in the stator assembly only once for each revolution of the flywheel. Since the system was not optimized energy was unnecessarily lost by the prior art system.

Therefore, there is a need for a fuel injection system that can be utilized in a flywheel magneto generator, which is energy efficient and optimized to provide sufficient energy to operate an engine.

BRIEF SUMMARY OF THE INVENTION

The present invention has been accomplished in view of the above-mentioned technical background, and it is an object of the present invention to provide a fuel injection system that allows a user to efficiently provide fuel to an engine.

In a preferred embodiment of the invention a fuel injection system is disclosed. The system includes a cover plate a coverplate coupled to a pull connector. A flywheel is disposed beneath the cover plate, where the flywheel is connected to the pull connector. The pull connector is configured to initiate movement of the flywheel. A first magnet coupled to the flywheel; a first magnetic sensor coupled to the coverplate, where the first magnetic sensor is configured to determine a length of the first magnet on the flywheel. A fuel injector coupled to the first magnetic sensor. The first magnetic sensor is configured to transmit a first signal to the fuel injector responsive to the first magnetic sensor determining the length of the first magnet on the flywheel.

In another preferred embodiment of the invention, a system for a flywheel magneto generator is disclosed. A coverplate is coupled to an ignition switch. A flywheel is disposed below the cover plate, where the flywheel is connected to the ignition switch. The ignition switch is configured to initiate movement of the flywheel. A magnet is coupled to the flywheel. A magnetic sensor is coupled to the coverplate, where the magnetic sensor is configured to determine a length of the magnet on the flywheel as the flywheel initiates movement. A fuel injector is operatively connected to the magnetic sensor, where the magnetic sensor is configured to transmit an electrical current to the fuel injector in response to the magnetic sensor determining the length of the magnet on the flywheel. A throttle body is coupled to the fuel injector. The fuel injector is configured to disperse fuel into the throttle body based on the magnetic sensor determining the length of the magnet on the flywheel.

In yet another preferred embodiment of the invention, a fuel injection system is disclosed. A crankshaft pulley is coupled to an ignition switch, where the ignition switch is configured to initiate movement of the crankshaft pulley. A magnet is coupled to the crankshaft pulley. A camshaft disposed above the crankshaft pulley. A first magnetic sensor is coupled to a crankshaft coverplate disposed above the crankshaft pulley. The first potentiometer is coupled to the first magnetic sensor. The first magnetic sensor is configured to determine a first length of the magnet on the crankshaft pulley as the crankshaft pulley initiates movement. The second potentiometer is coupled to a second magnetic sensor. The second magnetic sensor is coupled to the crankshaft coverplate disposed above the crankshaft pulley, where the second magnetic sensor is configured to determine a second length of the magnet on the crankshaft pulley as the crankshaft pulley initiates movement. A first fuel injector and a second fuel injector are operatively connected to the first magnetic sensor. A third fuel injector and a fourth fuel injector are operatively connected to the second magnetic sensor, where the first magnetic sensor is configured to transmit an electrical signal to a first fuel injector and the second fuel injector in response to the magnetic sensor determining the length of the magnet on the crankshaft pulley. The first magnetic sensor is configured to transmit an electrical signal to a first fuel injector and the second fuel injector in response to the magnetic sensor determining the length of the magnet on the crankshaft pulley. A throttle body coupled to the first fuel injector, the second fuel injector, the third fuel injector and the fourth fuel injector. An intake port is located next to the first fuel injector, second fuel injector, third fuel injector and fourth fuel injector. The first fuel injector and the second fuel injector are configured to disperse fuel into the intake port based on the first magnetic sensor determining the first length of the magnet on the crankshaft pulley.

BRIEF DESCRIPTION OF SEVERAL VIEWS OF THE DRAWINGS

These and other advantages of the present invention will become more apparent as the following description is read in conjunction with the accompanying drawings, wherein.

DETAILED DESCRIPTION OF THE INVENTION

The presently preferred embodiments of the invention are described with references to the drawings, where like components are identified with the same numerals. The descriptions of the preferred embodiments are exemplary and are not intended to limit the scope of the invention.

Figure 1:
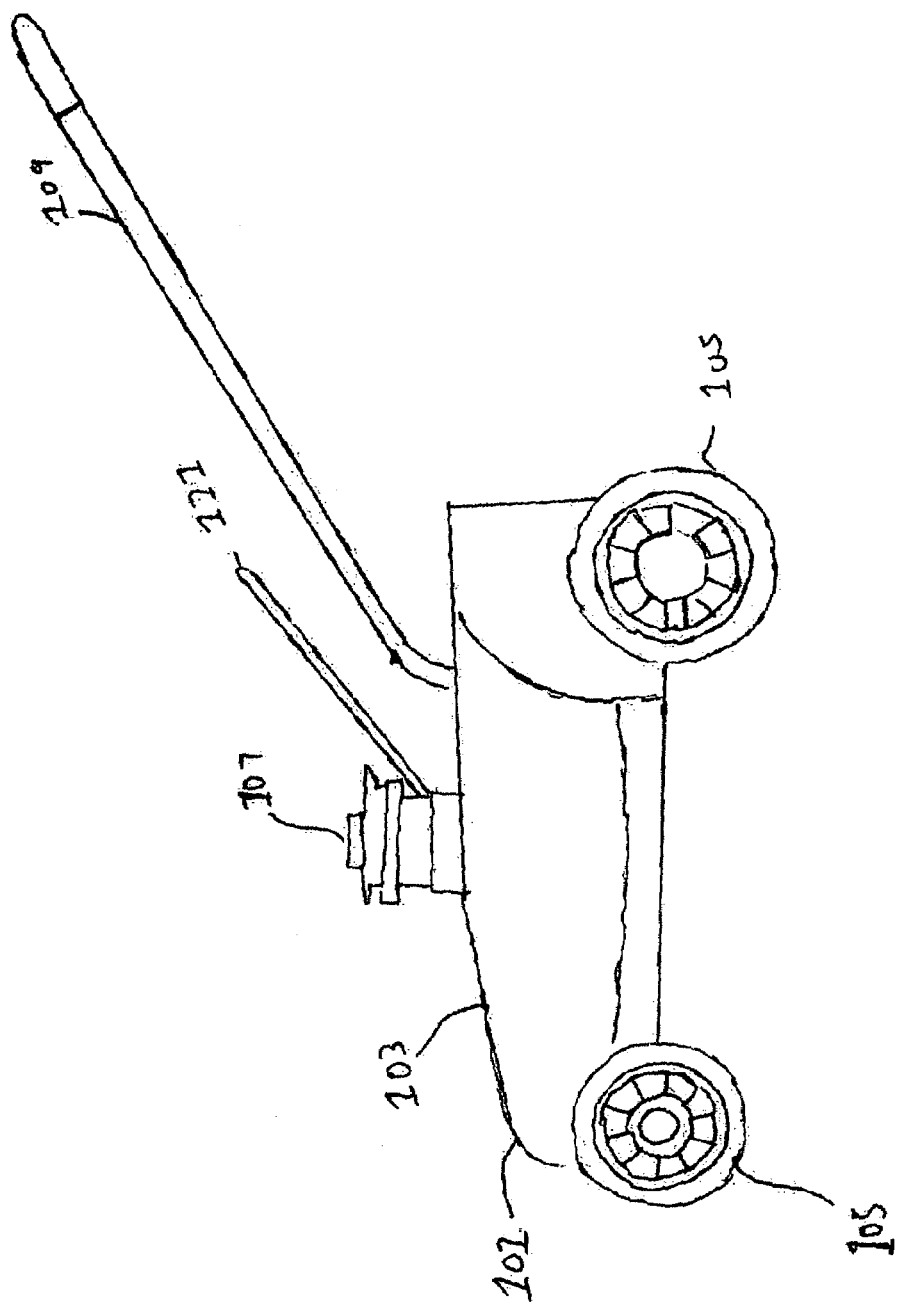
FIG. 1 illustrates a conventional lawn mower that utilizes a fuel injection system in a flywheel magneto generator system in accordance with an embodiment of the invention.

FIG. 1 illustrates a conventional lawn mower that utilizes a fuel injector system in the flywheel magneto generator system. Even though a lawn mower is utilized as an example to demonstrate how the fuel injection system is used in the flywheel magneto generator system, this fuel injection system may be employed in a snowmobile, snow blower, leaf blower or any device with a small engine or any device with a 4-cycle engine. Lawn mower 101 includes a vehicle body 103, four wheels 105 disposably rotated on the vehicle body 103, a motor 107 and two handle bars 109 extending radially from the vehicle body 103. The motor 107 is coupled to a pull connector 111 or typical cord, crank or ignition switch that is utilized to start or initiate the motor 107 or initialize movement of the lawn mower 101. The pull connector 111 may also be a typical ignition switch and starter motor utilized to start an engine 201 (FIG. 2) of the lawn mower 101.

Figure 2:
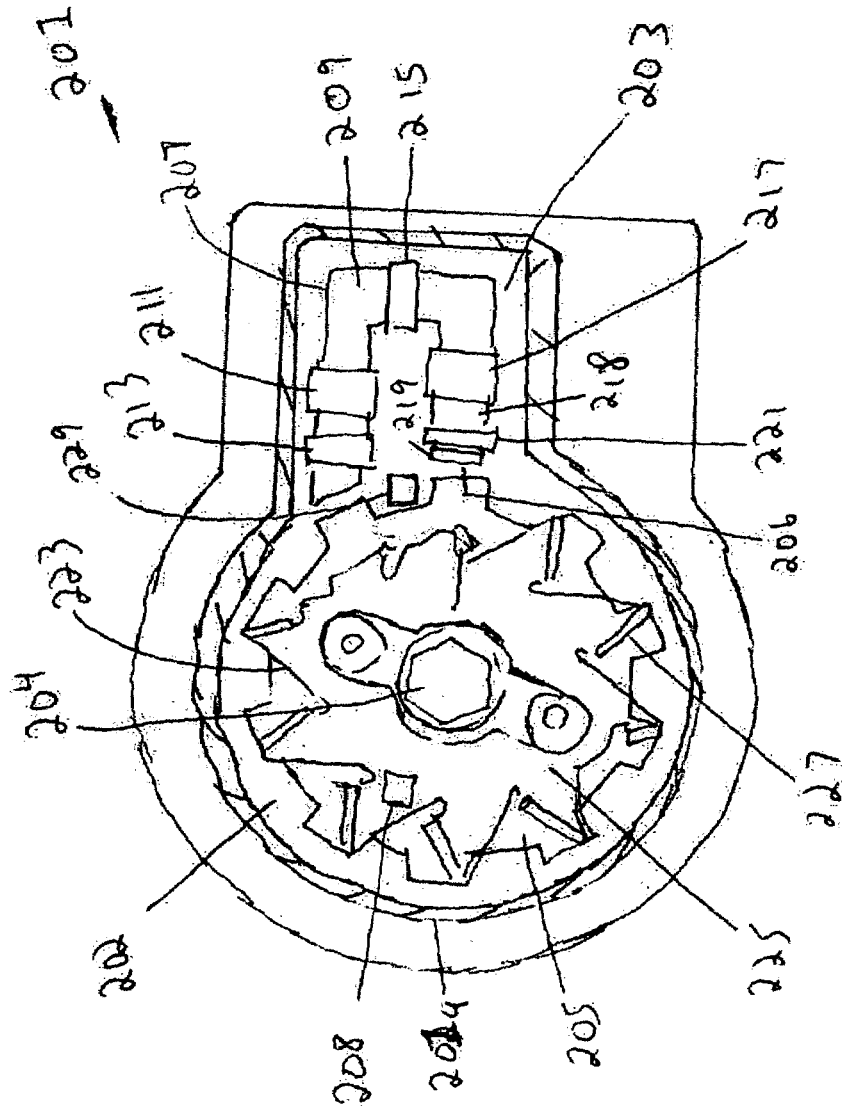
FIG. 2 illustrates a top view of a small engine in the lawn mower that includes the fuel injection system in the flywheel magneto generator system in accordance with an embodiment of the invention.

FIG. 2 illustrates a top view of an engine in the lawn mower 101. Engine 201 has a flywheel 202 with a rotor 205, which is mounted on the engine 201 for axial rotation. In particular, the flywheel 202 and rotor 205 are secured by a bolt 204 to the top of a vertical crankshaft 305 (FIG. 3) that is operatively connected by a rod (not shown) to a piston 315 (FIG. 3) of the engine 201. Flywheel 202 includes a magnet 208 or a first magnet 208 that is made of any suitable magnetic material such as, neodymium and is generally rectangular in form, preferably having a length and width in the range of about 2 to 10 millimeters. The magnet 208 may also have a circular shape having a diameter in the range of 5 to 30 millimeters. In another embodiment, magnet 208 is coupled to the flywheel 202 by the typical mechanical means utilized to attach a magnet such as bolting the magnet 208 to the flywheel 202. In another embodiment of the invention, magnet 208 may also be utilized to represent 2 or more magnets on flywheel 202. Flywheel 202 also includes a magnet 229 or a second magnet 229 located on a side portion of the flywheel 202 where the second magnet 229 contacts coil 211, coil 213, coil 215, coil 217 and coil 221. Magnet 229 may have a size in a range of 15 to 35% on a side face of the flywheel 202 depending on the size of flywheel 202. A 30-50% portion of magnet 229 closest to the magnetic sensor 303a, magnetic sensor 303b or magnetic sensor 303c (FIG. 3) is covered with a material that does not conduct electricity, such as aluminum, plastic, fiberglass or a heat-resistant plastic.

Referring to FIG. 2, engine 201 also includes a flywheel magneto generator 203, embodying this invention which includes the rotor 205, a stator module 207, having a core 209 with coils 211, 213, 215, 217 and 221 wrapped thereon, and a typical permanent magnet 219. The coils 217 and 221 are the primary and secondary of an exciter 218 flywheel magnet generator 203. Also, engine 201 includes a cover plate 201a that is secured or coupled to the engine body and encloses the rotor 205, the core 209, coil 211, coil 213, coil 215, coil 217, coil 221 and magnet 219. Air is admitted through openings (not shown) in the cover plate 201a.

The rotor 205 comprises a generally circular reluctor wheel 223. Also, the rotor 205 has a circular plate 225 secured to the top surface of a body FIG. 3 of the reluctor wheel 223. The plate 225 is shaped to form vanes. 227 bent to produce a flow of air to the engine 201 when the rotor 205 rotates. The core 209 of the stator module 207 is generally U-shaped and is mounted in a fixed position on a wall of the engine 201, at one side of the rotor 205. The core 209 is made of a highly magnetically permeable material such as a plurality of laminated plates of steel. The wire coil 211, coil 213, coil 215, coil 217 and coil 221, each comprising a plurality of turns of an electrically conductive wire such as copper, are wrapped around the core 209. The core 209 may also be referred to as a typical magneto of an engine. The magnet 219 is mounted on a first end 206 of the core 209 between the core 209 and the rotor 205.

Figure 3:
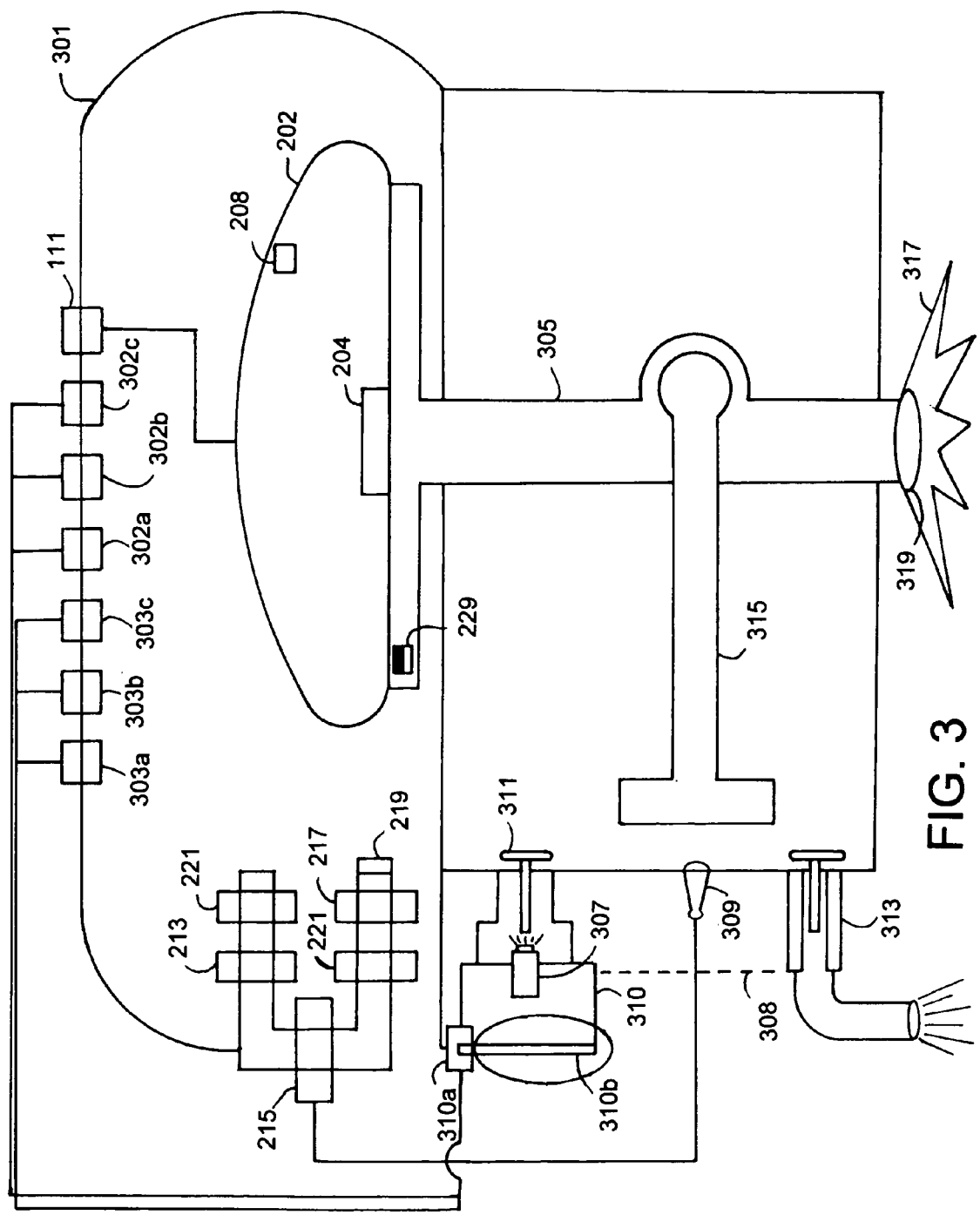
FIG. 3 illustrates a sectional view of the fuel injection system in the flywheel magneto generator system of FIG. 2 in accordance with an embodiment of the invention.

FIG. 3 illustrates a sectional view of the engine containing the fuel injector system of the flywheel generator of FIG. 2. Engine 201 includes a cover plate 301 having an opening for a typical pull connector 111 or cord or crank operatively connected to the flywheel 202 (FIG. 2) that is utilized to move the flywheel 202 to start engine 201, which initiates movement of a blade 317. Coverplate 301 is equivalent to coverplate 201a discussed above so a description is not disclosed herein. The flywheel 202 is disposed underneath or below coverplate 301. Flywheel 202 moves and spins around a block 204 of engine 201. In another embodiment, the engine 201 includes a typical switch that is operatively connected to the flywheel 202 to also start the engine 201 and initiate movement of the blade 317. A low switch 302a, medium switch 302b, and high speed switch 302c are coupled to a top portion of cover plate 301. Even though low speed switch 302a, medium speed switch 302b and high speed switch 302c are coupled to the cover plate 301 they may also be coupled to any portion of the lawn mower 101 (FIG. 1). The low speed switch 302a, medium speed switch 302b and high speed switch 302c are all electrically coupled to a throttle control sensor 310a. Low speed switch 302a, medium switch 302b and high speed switch 302c are coupled to the throttle control sensor 310a by a hard-wired connection or a wireless connection. The wireless connection may utilize radio frequency or infrared signals or any other typical wireless connection known to those of ordinary skill in the art. The hard-wired connection may be a wire connection or an electrical connection between the low speed switch 302a, medium speed switch 302b and high speed switch 302c operatively connected to the throttle control sensor 310a.

Cover plate 301 is secured to the engine 201 body and encloses the rotor 205, the core 209, coil 211, coil 213, coil 215, coil 217 and coil 221, the magnet 219 and the flywheel magnet 208 (FIG. 2). Also, the cover plate 301 includes a magnetic sensor 303a, a magnetic sensor 303b and a magnetic sensor 303c, which are utilized to determine if the magnet 208 or magnet 229 is on the flywheel 202 is rotating after the pull connector 111, or starter switch (not shown) turns the engine 201 ON. In another embodiment, magnetic sensors 303a, 303b and 303c may be replaced with gear tooth speed sensors 303a, 303b, and 303c. Gear tooth speed sensors 303a, 303b and 303c may also be referred to as hall-effect gear tooth speed sensors 303a, 303b and 303c. For this embodiment, magnet 208 may be replaced with a ferrous target or ferrous material 208. Gear tooth speed sensors 303a, 303b and 303c are utilized to detect the ferrous material 208 when the ferrous material 208 is disposed directly under the gear tooth speed sensors 303a, 303b and 303c.

Magnetic sensor 303a, magnetic sensor 303b and magnetic sensor 303c are utilized to determine if the magnet 208 is on the flywheel 202 when the pull connector 111 or switch (not shown) turns the engine 201 ON. Also, magnetic sensor 303a, magnetic sensor 303b and magnetic sensor 303c utilize the throttle control sensor 310a to determine the length of the magnet 208 as a factor of time. For example, the magnet sensor 303a determines a $1/8^{th}$ inch length of the magnet 208 when the flywheel 202 is rotating at a speed of about 2000-3000 revolutions per minute (rpm). Next, the magnetic sensors 303a and 303b, determines a $2/8^{th}$ inch length of the magnet 208 when the flywheel 202 is rotating at a speed of about 3000-4000 rpm. Finally, the magnetic sensors 303a, 303b and 303c determine a $3/8^{th}$ inch length of the magnet 208 when the flywheel 202 is rotating at a speed of about 4000-4500 rpm. The length of the magnet 208 or magnet 229 (FIGS. 4 and 5) sensed will be about 5-30 percent % of the size of the flywheel 202 for each of revolution of the flywheel 202. In an alternative embodiment, one magnetic sensor can be used in place of magnetic sensor 303a, magnetic sensor 303b and magnetic sensor 303c to detect the different lengths of the magnet 208. In another alternative embodiment of the invention, the vehicle may have 1 or 2 speeds, which utilizes 1 or 2 magnetic sensors respectively.

The magnetic sensor 303a, magnetic sensor 303b and magnetic sensor 303c are connected by a hard-wired or wireless connection to the fuel injector 307 in order to inject fuel into a throttle body 310 and intake valve 311 based on the length of the magnet 208 or magnet 229 determined. Fuel injector 307 is bolted or coupled to throttle body 310 with a nozzle of the fuel injector 307 facing the intake valve 311. Also, the fuel injector 307 may be bolted on an intake manifold consisting of the throttle body 310 and the intake valve 311, which is bolted to a cylinder head 308. Cylinder 308 includes the intake valve 311, spark plug 309 and exhaust valve 313. Fuel injector 307 utilizes a typical batch firing spraying system where the amount of fuel sprayed by the fuel injector 307 is ½ the amount of a pulse width needed to run the engine 201. Pulse width is a measurement of time in milliseconds fuel is sprayed by the fuel injector 307 onto the intake valve 311 with respect to each revolution of the flywheel 202 or crankshaft 305. Next to the flywheel 202, are magnetic sensor 303a, magnetic sensor 303b and magnetic sensor 303c that receive power or voltage from a hard-wired connection or wireless connection to a battery (not shown) of engine 201. This magnetic sensor 303a, magnetic sensor 303b and magnetic sensor 303c can be typical magnetic sensors or proximity sensors made by the Cherry Corporation located at 10411 Corporate Drive #102, Pleasant Prairie, Wis. 53158-1611.

Engine 201 has a bottom portion that includes a crankshaft 305 operatively connected by a rod (not shown) to a piston 315. Crankshaft 305 is also connected by a bolt 319 to a blade 317, which causes the blade 317 to move when the piston 315 moves. Piston 315 is disposed next to the intake valve 311 to receive a fuel and air mixture (gasoline) from the throttle body 310. The intake valve 311 is next to the throttle body 310, where a nozzle of the fuel injector 307 is bolted to the throttle body 310. The nozzle of the fuel injector 307 sprays or disperses fuel stored in the fuel injector 307 onto the intake valve 311 after it receives a signal or electrical current from the magnetic sensor 303a, magnetic sensor 303b or magnetic sensor 303c. Magnetic sensor 303a, magnetic sensor 303b and magnetic sensor 303c are also connected by a hard-wire connection or a wireless connection to a throttle control sensor 310a, where the throttle control sensor 310a instructs: the magnetic sensor 303a to sense, for example $1/8^{th}$ inch of the magnet 208 as a factor of time if the low speed switch 302a is pressed; the magnetic sensors 303a and 303b to sense, for example $2/8^{th}$ inch of the magnet 208 as a factor of time if the medium speed switch 302b is pressed; and the magnetic sensors 303a, 303b and 303c to sense, for example $3/8^{th}$ inch of the magnet 208 as a factor of time if the high speed switch 302c is pressed. For each of the different speed switches, low speed switch 302a, medium speed switch 302b and high speed switch 302c, respectively works with magnetic sensors 303a and 303b, these magnetic sensors 303a and 303b sense a length of the magnets 208 and magnet 229 in a range of about $1/8^{th}$ of an inch to about 1 inch. The throttle control sensor 310a is bolted to the top portion of throttle body 310. Also, the throttle control sensor 310a is coupled or bolted to a throttle plate 310b in order for the throttle control sensor 310a to open it as needed. The throttle plate 310b is a typical air flow mechanism with an air flap that regulates air flow into the throttle body 310 and intake valve 311 based on a message received by the throttle control sensor 310a when a user presses a low speed switch 302a, medium speed switch 302b or high speed switch 302c. The throttle plate 310b may be referred to as a butterfly valve, butterfly mechanism or throttle valve. A typical throttle plate includes a disk turning on a diametrical axis inside a pipe, used as a throttle valve or damper. In addition, the throttle plate 310b may be composed of two semicircular plates hinged on a common spindle, used to permit air to flow in one direction only.

The throttle control sensor 310a is a conventional computer that includes a memory, processor, input/output controller, a connection interface and a communication link (hard-wired connection or wireless connection) connecting it to the low speed switch 302a, medium speed switch 302b, high speed switch 302c, magnetic sensor 303a, magnetic sensor 303b and magnetic sensor 303c and battery (not shown) of engine 201. The processor in the throttle control sensor 310a detects the level of air pressure in the throttle body 310. Also, the processor of the throttle control sensor 310a instructs the magnetic sensor 303a, magnetic sensor 303b and magnetic sensor 303c to look for magnet 208 on the flywheel 202. Next, when the magnet 208 is found the processor of the throttle control sensor 310a instructs: the magnetic sensor 303a to determine a length of the magnet 208 based on if the low speed switch 302a is pressed; the magnetic sensors 303a and 303b to determine a length of the magnet 208 based on if the medium speed switch 302b is pressed; and the magnetic sensors 303a, 303b and 303c to determine a length of the magnet 208 based on if the high speed switch 302c is pressed. In response to the magnetic sensor 303a, magnetic sensor 303b or magnetic sensor 303c determining a length of the magnet 208, the magnetic sensor 303a, magnetic sensor 303b or magnetic sensor 303c sends a signal or electrical current to the fuel injector 307 to disperse or spray fuel, which is based on a pulse width formula of the processor in throttle control sensor 310a, onto the intake valve 311. Intake valve 311 opens and closes based on the rotation of the flywheel 202 and engine 201 that provides fuel to the spark plug 309. This pulse width (PW) formula, equation or software program in the processor of the throttle control sensor 310a operates as follows:

$$PW = 5 \text{ to } 85\% \text{ duty cycle}/((\text{Rpm of flywheel } 202/60) \times 10)$$

The duty cycle is between 5 to 85% is the percentage of the fuel injector 307 that stays open to spray fuel onto the intake valve when the engine 201 is running. The Rpm is the revolutions per minute the flywheel 202 is rotating around the block 204. The numerical value 60 is hertz which is a figure used for this batch fuel injection system and 10 is a constant for this formula. For each speed, such as low speed 302a, medium speed 302b and high speed 302c, a pulse width is determined. The opening of the throttle plate 523 is in the range of about 0 to 120 degrees, which is in direct relation to 5 to 85% duty cycle. Pulse width, as stated above, is a length of time usually in milliseconds that fuel will be dispersed by the fuel injector 307 onto the intake valve 311. For example, for low speed 302a the duty cycle is 5, which is divided by the 2000 rpm that is divided by 60 and multiplied by 10 to produce 15 milliseconds of which fuel will be sprayed by the fuel injector 307 onto the intake valve 311. The range for revolutions per minute for low speed 302a is in the range of about 1000-3000. For example, for the medium speed 302b the duty cycle will be 10, which is divided by the 3000 rpm that is divided by 60 and multiplied by 10 to produce 20 milliseconds of which fuel will be sprayed by the fuel injector 307 onto the intake valve 311. The range for revolutions per minute for medium speed is in the range of 3000-4000 rpm and duty cycle is in the range of 10 to 15. For example, for the high speed 302c, the duty cycle is 15, which is divided by the 4000 rpm that is divided by 60 and multiplied by 10 to produce 22 milliseconds of which fuel will be sprayed by the fuel injector 307 onto the intake valve 311. The range for revolutions per minute for medium speed is in the range of 4000-4500 rpm and duty cycle is in the range of 15 to 25. The processor in the throttle control sensor 310a electronically adjusts the opening of the throttle plate 310b based on if the throttle plate 310b receives a signal from the low speed switch 302a, medium speed switch 302b or high speed switch 302c.

In yet another embodiment of the invention, the processor of the throttle control sensor 310a instructs the magnetic sensor 303a, magnetic sensor 303b or magnetic sensor 303c to stop looking for the magnet 208 on the flywheel 202 and send electrical current to the fuel injector 307 to stop spraying fuel into the throttle body 310 and intake valve 311. In another embodiment of the invention, a typical controller device with a hard-wired or wireless connection with the throttle control sensor 310a may be utilized to control the operation of the throttle control sensor 310a.

The throttle plate 310b operates with the throttle control sensor 310a in several ways. For example, when the throttle control sensor 310a is activated by the low speed switch 302a, then the throttle plate 310b will be closed so air will not flow to the throttle body 310 and intake valve 311. However, when the throttle control sensor 310a is activated by a user pressing medium speed switch 302b then throttle control sensor 310a instructs the throttle plate 310b to open up its air flap to about 1 to 10 degrees to allow air to flow through it to the throttle body 310 and intake valve 311. Preferably, the air flap of the throttle plate 310b will open up to about 10 degrees. In another example, when the throttle control sensor 310a is activated by a user pressing a high speed switch 302c then the throttle control sensor 310a instructs the throttle plate 310b to open up its air flap up to about 10-20 degrees to allow air to flow through it into the throttle body 310 and intake valve 311. Preferably, the air flap of the throttle plate 310b will be opened to about 20 degrees.

Next to the throttle control sensor 310a, is a typical spark plug 309, which is connected to intake valve 311. As stated above when the flywheel 202 moves and spins around the block 204, the partially covered magnet 229 brushes against or makes contact with magneto 209, coil 211, coil 213, coil 215, coil 217 and coil 221 to create a magnetic field. When this magnetic field is created between the magnet 229, magneto 209, coil 211, coil 213, coil 215, coil 217 and coil 221 a signal or electrical current is sent from the magneto 209, coil 211, coil 213, coil 215, coil 217 and coil 221 through a connection to the spark plug 309, which excites the spark plug 309. Spark plug 309 is connected by a hard-wire connection to the magneto 209, coil 211, coil 213, coil 215, coil 217 and coil 221. This hard-wired connection or wireless connection is equivalent to the hard-wired connection or wireless connection, which was described above, utilized by low speed switch 302a, medium speed switch 302b, high speed switch 302c and the magnetic sensor 303a, magnetic sensor 303b and magnetic sensor 303c respectively. Before the spark plug 309 is excited to cause a spark, the fuel injector 307 disperses or sprays fuel, as stated above, onto the intake valve 311 as air is also allowed into the throttle body 310 by the throttle plate 310b depending on if the low speed switch 302a, medium speed switch 302b, or high speed switch 302c is pressed. When the fuel and air are combined in the throttle body 310, the piston 315 is in close proximity to intake valve 311, then the spark plug 309 emits a spark to ignite the fuel and air mixture (gasoline) in the throttle body 310 or intake valve 311 causing the fuel and air mixture to explode, which causes the piston 315, as in a typical combustion engine, to move in a typical horizontal manner back and forth or typical vertical manner of up and down depending on the application. As the piston 315 begins to move then the crankshaft 305 moves with the blade 317 causing the lawn mower 101 to operate. As the piston 315 begins to stop moving because the gasoline mixture has decreased, then the exhaust valve 313 opens and exhaust of the fuel and air mixture is expelled through the exhaust valve 313.

Figure 4:
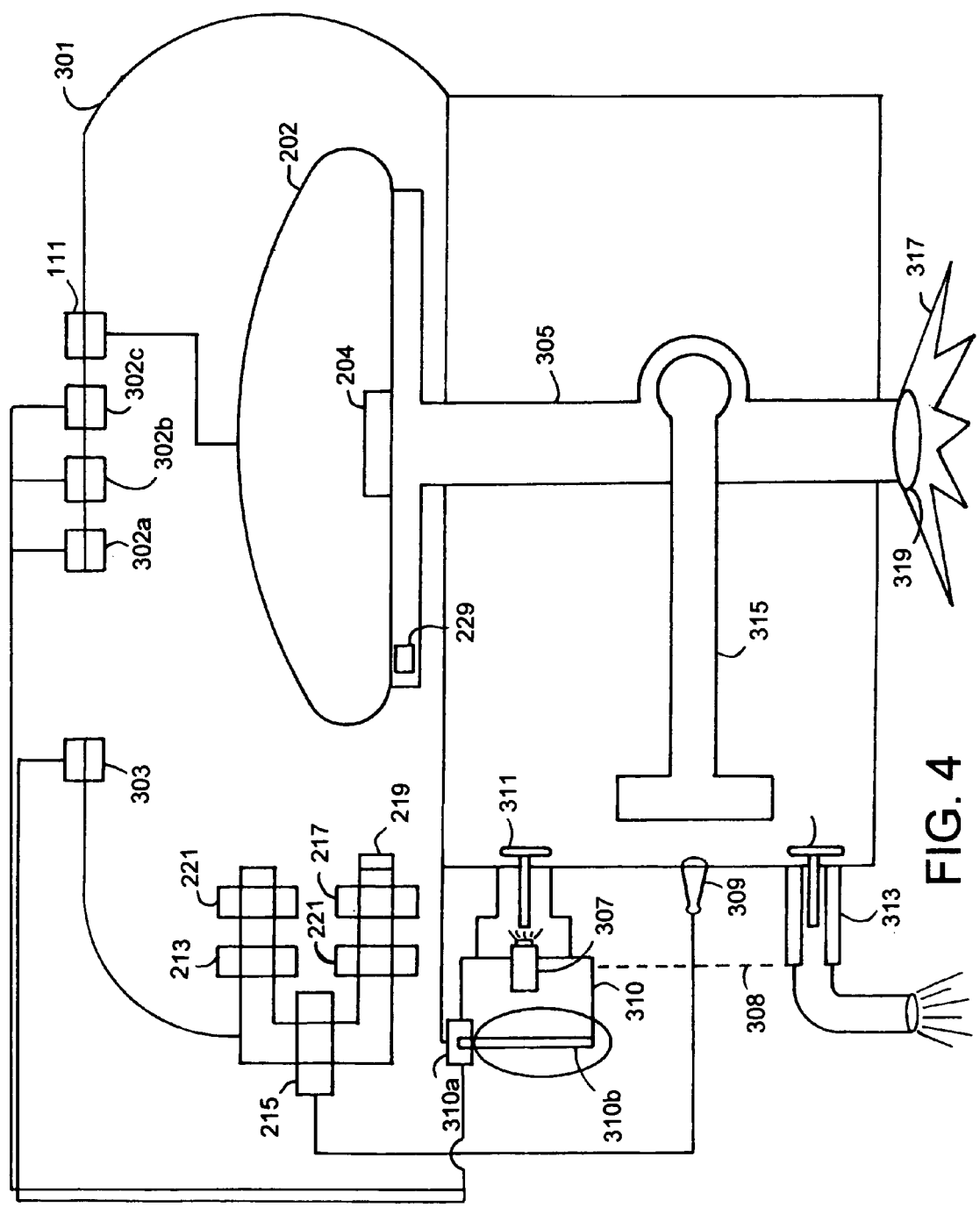
FIG. 4 illustrates another sectional view of the fuel injection system in the flywheel magneto generator system utilized by a small vehicle in accordance with the embodiment of the invention.

FIG. 4 illustrates another sectional view of the fuel injection system in the flywheel magneto generator system. This FIG. 4 includes most of the same components as shown in FIG. 3 so a description of these components is not disclosed herein. However, in this description, magnet 229 is uncovered and it is utilized in place of magnet 208. In another embodiment, other magnets may be placed on top of the flywheel 202 to increase the revolutions per minute (rpm) of the flywheel 202. Also, magnetic sensors 303a, 303b and 303c are replaced with magnetic sensor 303. Pull connector 111 is a typical starter switch or typical ignition switch utilized to turn ON the following small four cycle engines such as lawnmowers, some riding lawn mowers, tillers, snow blowers, leaf blowers, small generators and a series hybrid which basically operates at fixed selected speeds to generate electricity to power an electric motor. The operation of this flywheel magneto generator is equivalent to the operation of the flywheel magneto generator 203 of FIGS. 2 and 3.

Figure 5:
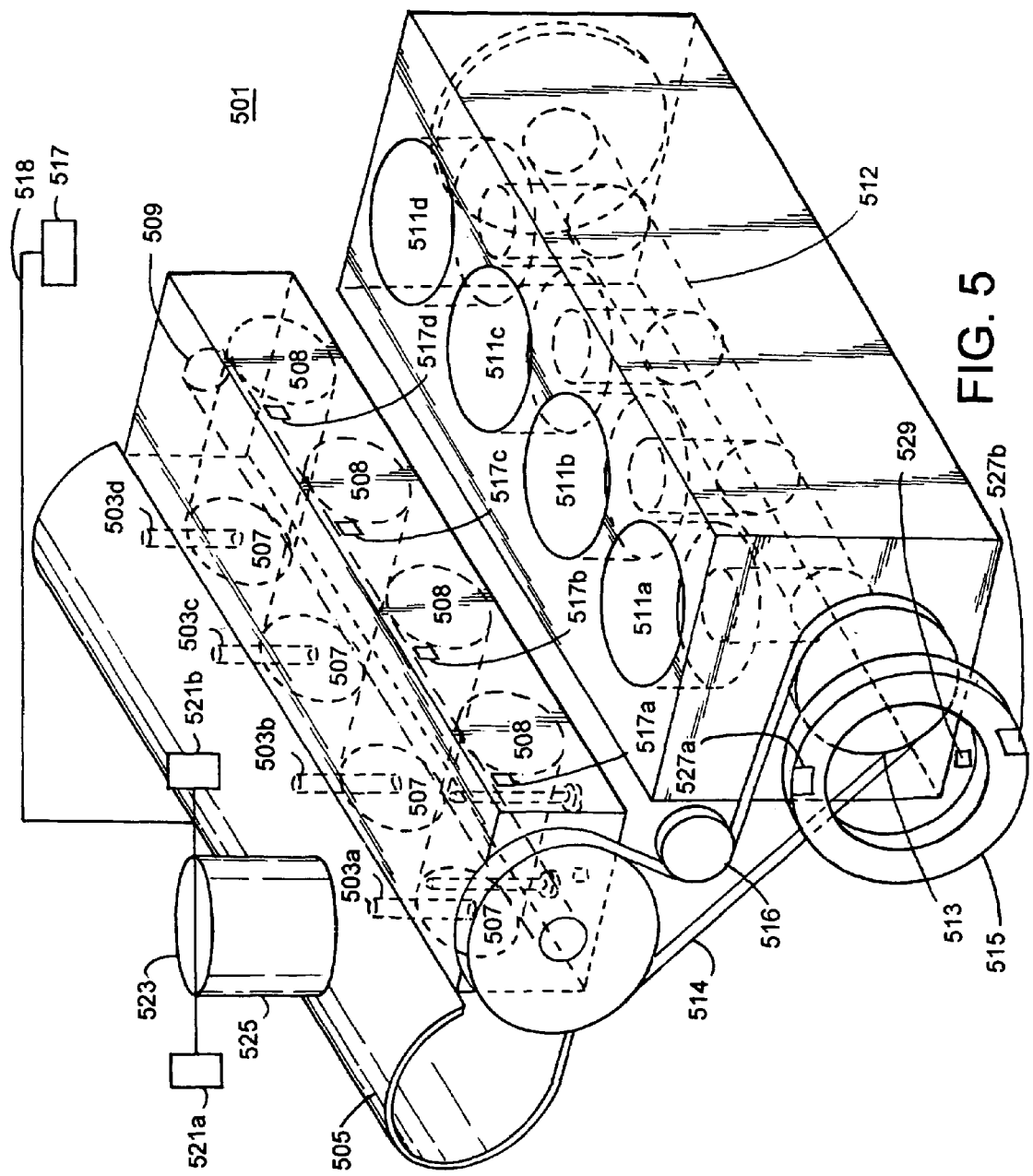
FIG. 5 illustrates yet another sectional view of the fuel injection system utilized by a small vehicle in accordance with the embodiment of the invention.

FIG. 5 illustrates a sectional view of a fuel injector system in a small vehicle. For this embodiment of the invention, an ignition switch (not shown) is utilized to turn ON a go-cart, small tractors, some riding lawnmowers, small vehicles or an automobile on. Engine 501 is a typical engine used for a go-cart, small tractors, some riding lawnmowers, small vehicles or an automobile or a motorcycle. This engine 501 includes: fuel injector 503a, fuel injector 503b, fuel injector 503c, fuel injector 503d, an intake manifold 505, intake port 507, camshaft 509, piston 511a, piston 511b, piston 511c, piston 511d, crankshaft pulley 513, a belt 514, a crankshaft coverplate 515, a tensioner 516, a spark plug 517a, spark plug 517b, spark plug 517c, spark plug 517d and exhaust port 508.

Typically, the operation of engine 501 is initiated when a person turns ON an ignition switch of a go-cart or small vehicle by inserting a key into a typical ignition port (not shown), which produces a high voltage electrical charge that is transmitted through ignition wires (not shown), an ignition coil (not shown) and a distributor cap (not shown) to the spark plug 517a, spark plug 517b, spark plug 517c and spark plug 517d. This high voltage electrical charge makes an electrical charge occur in the spark plug 517a, spark plug 517b, spark plug 517c and spark plug 517d. Also, the ignition switch is operatively connected to the crankshaft pulley 513 to start the crankshaft pulley 513 moving, which starts engine 501. This crankshaft pulley 513 is connected to the camshaft 509 by the belt 514. Belt 514 may also be referred to as a chain or timing belt. The connection of the camshaft 509 and the crankshaft pulley 513 by the belt 514 controls the lifting and closing of intake port 507 and the exhaust port 508. Intake valve (not shown) is located inside of the intake port 507. An exhaust valve (not shown) is located inside the exhaust port 508. Camshaft 509 upon rotation opens and closes the intake and exhaust valves. Since the main job of the belt 514 is synchronizing the speed of the crankshaft pulley 513 and the speed of a fuel injection system it is called a timing belt.

The tensioner 516 is located on the belt 514 in between the camshaft 509 and the crankshaft pulley 513. This tensioner 516 is a typical tensioner used in automobiles. Also, this tensioner 516 reduces belt 514 slack and transmits drive torque uniformly. Further, tensioner 516 reduces noise and vibration, decreases belt 514 wear and increase the life of the camshaft 509 and the crankshaft pulley 513. The crankshaft pulley 513 connected by a connecting rod 512 to the pistons 511a, 511b, 511c and 511d converts the up and down (reciprocating) motion of the pistons 511a, 511b, 511c and 511d into a turning (rotary) motion. This up and down motion of the pistons 511a, 511b, 511c and 511d provides the turning motion for wheels (not shown), where the crankshaft pulley 513 is coupled to a typical transmission and belt that in turn is coupled to the wheels (not shown) of the small vehicle. Crankshaft pulley 513 works much like the pedals of a bicycle, converting up-down motion of pistons 511a, 511b, 511c and 511d into rotational motion. The crankshaft pulley 513 is usually either made of alloy steel or cast iron. A magnet 529 is bolted onto a side of the crankshaft pulley 513, where the magnet 529 has a size in the range of about 3-10 millimeters.

In this embodiment, a gas pedal 517 for a small vehicle, such as a go-cart, a riding lawnmower, small tractor or small vehicle is electrically connected by an electrical cable 518 to a potentiometer 521a and a potentiometer 521b. Potentiometers 521a and 521b are coupled to a throttle plate 523, where the throttle plate 523 is bolted onto the throttle body 525. Throttle plate 523 is equivalent to the throttle plate 310b discussed above so a description of throttle plate 523 will not be included herein. The throttle body 525 is equivalent to the throttle body 310 discussed above so a description will not be included herein. The throttle body 525 is part of the intake manifold 505 along with the intake port 507. When a user presses the gas pedal 517 to accelerate a go-cart, the potentiometers 521a and 521 receives the electronic signal or message by the cable 518 from the gas pedal 517 then transmits a signal through an electrical connection (not shown), which is a hard-wired connection or a wireless connection described above, to magnetic sensor 527a and magnetic sensor 527b to detect the various lengths of magnet 529 in relation to the number of times the crankshaft pulley 513 revolves or rotates around a bolt 531. Magnetic sensors 527a and 527b are secured or bolted on opposite ends of a crankshaft coverplate 515 that is bolted on to the engine 501. Crankshaft coverplate 515 encapsulates crankshaft pulley 513, so the crankshaft coverplate 515 is disposed above the crankshaft pulley 513. In another embodiment, magnetic sensors 527a and 527b may be replaced with gear tooth speed sensors 527a and 527b. Gear tooth speed sensors 527a and 527b may also be referred to as hall-effect gear tooth speed sensors 527a and 527b. For this embodiment, magnet 529 may be replaced with a ferrous target or ferrous material 529. Gear tooth speed sensors 527a and 527b are utilized to detect the ferrous material 529 when the ferrous material 529 is disposed directly under the gear tooth speed sensors 527a and 527b.

Potentiometers 521a and 521b are each computers that include a processor, a memory, an input/output controller, a connection interface and a communication link (hard-wired connection or wireless connection) connecting them respectively to the magnetic sensors 527a and 527b. Magnetic sensors 527a works with fuel injectors 503a and 503d while magnetic sensor 527b works with fuel injectors 503b and 503c. These processors also include a pulse width (PW) formula, software or equation that operates as follows:

$$PW = 5 \text{ to } 85\% \text{ duty cycle}/((\text{Rpm of crankshaft pulley } 513/60) \times 10)$$

The duty cycle is between 5 to 85% of is the percentage of the fuel injectors 503a, 503b, 503c and 503d stays open or sprays fuel onto the intake port 507 when the engine 501 is running. Also, this duty cycle is related to the amount of degrees the throttle plate 523 can be opened. The range for the throttle plate 523 opening is from about 0 to 120 degrees, which is directly related to 5 to 85% duty cycle. Thus, if the throttle plate 523 is closed then the duty cycle will be 5. The Rpm is the revolutions per minute the crankshaft pulley 513 is rotating around the block 531. The numerical value 60 is hertz which is a figure used for this batch fuel injection system and 10 is a constant for this formula. For each time the gas pedal 517 is pressed a pulse width is determined.

Pulse width, as stated above, is a length of time usually in milliseconds that fuel will be dispersed by the fuel injectors 503a, 503b, 503c and 503d into the intake port 507. For example, when a person lightly touches the gas pedal 517 the duty cycle is 5, which is divided by the 2000 rpm that is divided by 60 and multiplied by 10 to produce 15 milliseconds of which fuel will be sprayed by the fuel injectors 503a and 503d into the intake port 507. When the fuel injectors 503a and 503d stops spraying fuel into the intake port 507, then the fuel injectors 503b and 503c will spray fuel for 15-milliseconds into the intake port 507. The range for revolutions per minute for the crankshaft pulley 513 is in the range of about 1000-3000 rpm. For example, for the person mid way pressing the gas pedal 517 the duty cycle will be about 20, which is divided by the 3000 rpm that is divided by 60 and multiplied by 10 to produce 40 milliseconds of which fuel will be sprayed by the fuel injector 503a and 503d into the intake port 507. When the fuel injectors 503a and 503d stop spraying fuel into the intake port 507, then the fuel injectors 503b and 503c will spray fuel for 40 milliseconds into the intake port 507. The range for revolutions per minute for the crankshaft pulley 513 at medium speed is in the range of 3000-4000 rpm and duty cycle is in the range of 5 to 85 or 5 to 85% depending on the opening of throttle plate 523. For example, when the gas pedal 517 is fully pressed the duty cycle may be 25, which is divided by the 4000 rpm that is divided by 60 and multiplied by 10 to produce 37.5 milliseconds of which fuel will be sprayed by the fuel injectors 503a and 503d into the intake port 307. When the fuel injectors 503a and 503d stop spraying fuel into the intake port 507, then the fuel injectors 503b and 503c will spray fuel for 37.5 milliseconds into the intake port 507. The range for revolutions per minute for medium speed is in the range of 4000-4500 rpm and duty cycle is in the range of 5 to 85%.

Potentiometer 521a works with magnetic sensor 527a to detect different lengths of the magnet 529 on the crankshaft pulley 513 to disperse fuel from the fuel injectors 503a and 503d into the intake port 507. After the fuel injectors 503a and 503d finishes dispensing fuel into the intake port 507, then the potentiometer 521b works with magnetic sensor 527b to detect different lengths of the magnet 529 on the crankshaft pulley 513 to disperse fuel from the fuel injectors 503b and 503c into the intake port 507 to increase the speed of the go-cart as the user continues to press the gas pedal 517.

Potentiometers 521a and 521b may also be referred to as a time delay relay unit with a built in potentiometer. Potentiometers 521a and 521b have pre-programmed lengths of time in milliseconds for each speed selection allowing contact respectively of the magnetic sensors 521a and 521b and magnet 529 for those preprogrammed times during each revolution of the crankshaft pulley 513. The potentiometers 521a and 521b are similar to volume a control knob that adjusts voltage, because it activates the magnetic sensors 527a and 527b for a specific length of time. For example, when the gas pedal 517 is pressed an electrical signal is sent by electrical cable 518 to the potentiometers 521a and 521b, which transmits a signal to the throttle plate 523 to keep the air flap of the throttle plate 523, closed or open the air flap of the throttle plate 523. The opening of the throttle plate 523 is in the range of about 0 to 120 degrees, which is in direct relation to the duty cycle of 5 to 85% for the pulse width formula. For example if the person does not press the gas pedal 517, when the engine is idle, the potentiometers 521a and 521b transmits a signal to the throttle plate 523 to keep it closed. The throttle plate will have a 0 degree of opening and a duty cycle of 5 will be utilized in the pulse width formula in a processor of potentiometers 527a and 527b. When the low speed is selected by a person slightly pressing the gas pedal 517, the potentiometers 521a and 521b receives a signal by cable 518 from the gas pedal 517, which is then transmitted to the throttle plate 523 to open the throttle plate 523b to about 10 to 20 degrees. The throttle plate 523 will be opened in a range of about 10 to 20 degrees and a duty cycle of 20 to 40 will be utilized in the pulse width formula in a processor of potentiometers 521a and 521b. For medium speed, the person would mid way press the gas pedal 517, then the potentiometers 527a and 527b receives a signal by cable 518 from the gas pedal 517, which is then transmitted to the throttle plate 523 to open the throttle plate 523 in a range of about 10-20 degrees. The throttle plate 523 will be opened in a range of about 10 to 20 degrees and a duty cycle of 20 to 40 will be utilized in the pulse width formula in a processor of potentiometers 521a and 521b. For high speed, the person would fully press the gas pedal 517, then the potentiometers 521a and 521b receives a signal by cable 518 from the gas pedal 517, which is then transmitted to the throttle plate 523 to open the throttle plate 523 to open the throttle plate 523 in a range of about 10-20 degrees. The throttle plate 523 will be opened in a range of about 10-20 degree of opening and a duty cycle in a range of about 2040 will be utilized in the pulse width formula in a processor of potentiometers 521a and 521b.

By utilizing the gas pedal 517 potentiometer 521a and potentiometer 521b operating with the throttle plate 523 a user is able to utilize the fuel injectors 503a, 503b, 503c and 503d to disperse fuel into the intake port 507. When the ignition switch is turned ON and a person presses the gas pedal 517, then the gas pedal 517 through cable 518 transmits a signal to the potentiometer 521a and potentiometer 521b. At the potentiometer 521a a signal is sent to the magnetic sensor 527a. At this same time the ignition switch has initiated the movements of pistons 511a and 511d, which moves vertically to the top or top dead center and the intake port 507, then these pistons 511a and 511d move down to let the engine 501 take in a cylinder full of air and gasoline. This is the intake stroke. The magnetic sensor 527a detects the length of the magnet 529, then potentiometer 527a utilizes the pulse width formula of its processor to utilize fuel injectors 503a and 503d to spray fuel into the throttle body 525 and intake port 507. When the fuel and air are combined in the throttle body 525 and intake port 507, which makes a fuel/air mixture, the pistons 511a and 511d move back up to compress the fuel/air mixture in a compression making the explosion more powerful. Next, when the pistons 511a and 511d reach the top of its stroke the spark plugs 517a and 517d emits a spark to ignite the fuel/air mixture (gasoline), then the fuel and air mixture explodes, which causes the pistons 511a and 511d, as in a typical combustion engine, to move in a typical horizontal manner of back and forth or a typical vertical manner of up and down depending on the application. When the pistons 511a and 511d begins to move, then the crankshaft pulley 513 moves with a typical transmission (not shown) and a typical belt (not shown). Crankshaft pulley 513 is connected by a cable or the typical mechanical connection means utilized in vehicles to the typical transmission. Transmission is connected by a cable or the typical mechanical connection used in vehicles to the typical belt. The typical belt is connected by a cable or the typical mechanical connection used in vehicles to wheels (not shown) of the vehicle. The movement of the belt causes the wheels of the go-cart or small tractor to move. When the pistons 511a and 511d hits the bottom of its stroke, the exhaust port 508 opens and exhaust leaves through a typical tail pipe (not shown) of the go-cart. The pistons 511a and 511d begin to stop moving because the gasoline mixture has decreased.

Next, the potentiometer 521b is activated and a signal is sent to the magnetic sensor 527b. At this same time the ignition switch has initiated the movements of pistons 511b and 511c, which moves vertically to the top or top dead center and the intake port 507, then these pistons 511b and 511c move down to let the engine 501 take in a cylinder full of air and gasoline. This is the intake stroke. The magnetic sensor 527b detects the length of the magnet 529, then potentiometer 527b utilizes the pulse width formula of its processor to utilize fuel injectors 503b and 503c to spray fuel into the throttle body 525 and intake port 507. When the fuel and air are combined in the throttle body 525 and intake port 507, which makes a fuel/air mixture, the pistons 511b and 511c move back up to compress the fuel/air mixture in a compression making the explosion more powerful. Next, when the pistons 511b and 511c reach the top of its stroke the spark plugs 517b and 517c emits a spark to ignite the fuel/air mixture (gasoline), then the fuel and air mixture explodes, which causes the pistons 511b and 511c, as in a typical combustion engine, to move in a typical horizontal manner of back and forth or a typical vertical manner of up and down depending on the application. When the pistons 511b and 511c begin to move, then the crankshaft pulley 513 moves with a typical transmission (not shown) and a typical belt (not shown). Crankshaft pulley 513 is connected by a cable or the typical mechanical connection means utilized in vehicles to the typical transmission. Transmission is connected by a cable or the typical mechanical connection used in vehicles to the typical belt. Typical belt is connected by a cable or the typical mechanical connection used in vehicles to wheels (not shown) of the vehicle. The movement of the belt causes the wheels of the go-cart or small tractor to move. When the pistons 511b and 511c hits the bottom of its stroke, the exhaust port 508 opens and exhaust leaves through a typical tail pipe (not shown) of the go-cart. The pistons 511b and 511c begin to stop moving because the gasoline mixture has decreased.

Figure 6:
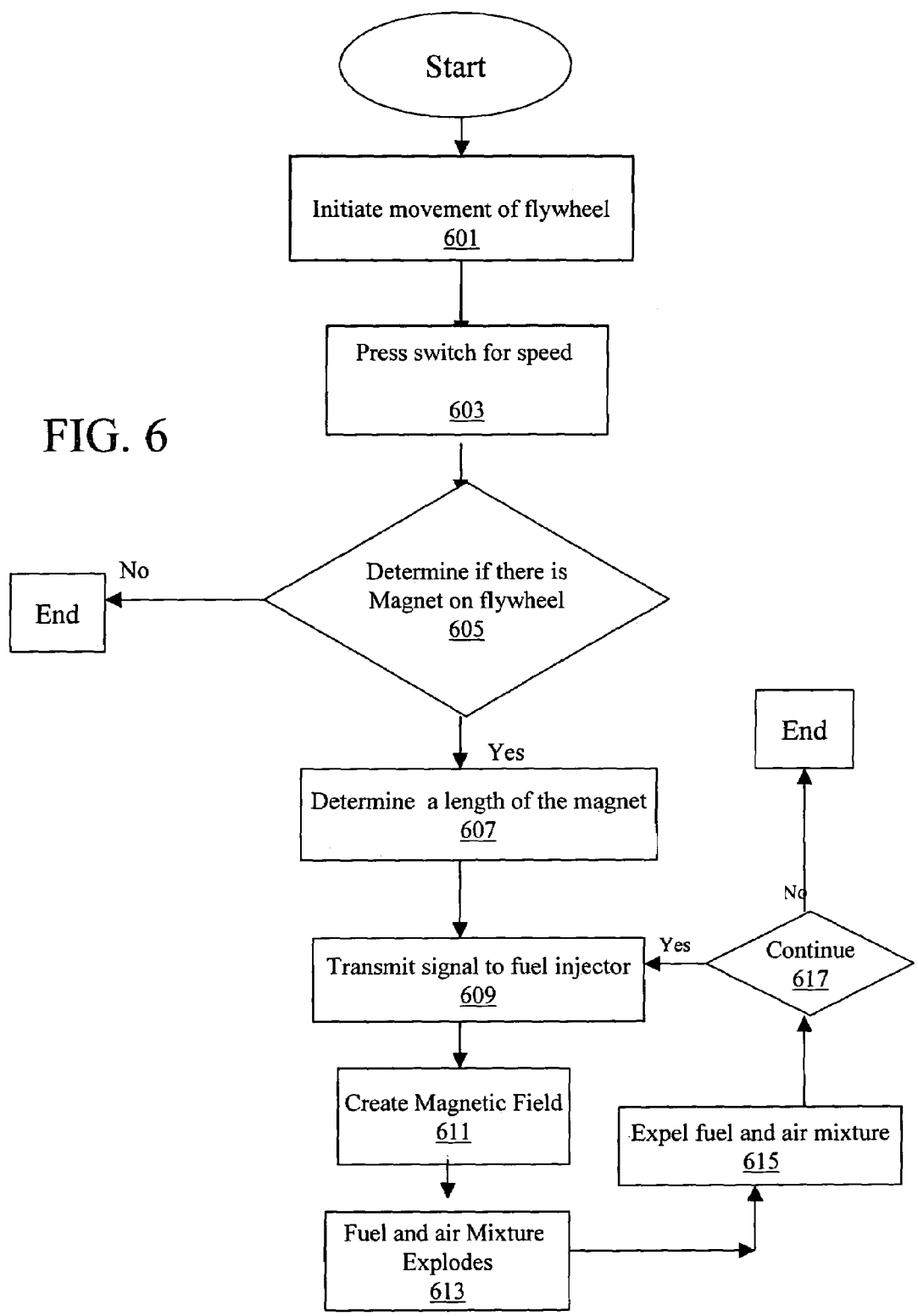
FIG. 6 is a flow chart that depicts a method of how the fuel injection system in the flywheel magneto generator system of FIGS. 3 and 4 is employed in accordance with the embodiment of the invention.
Figure 7:
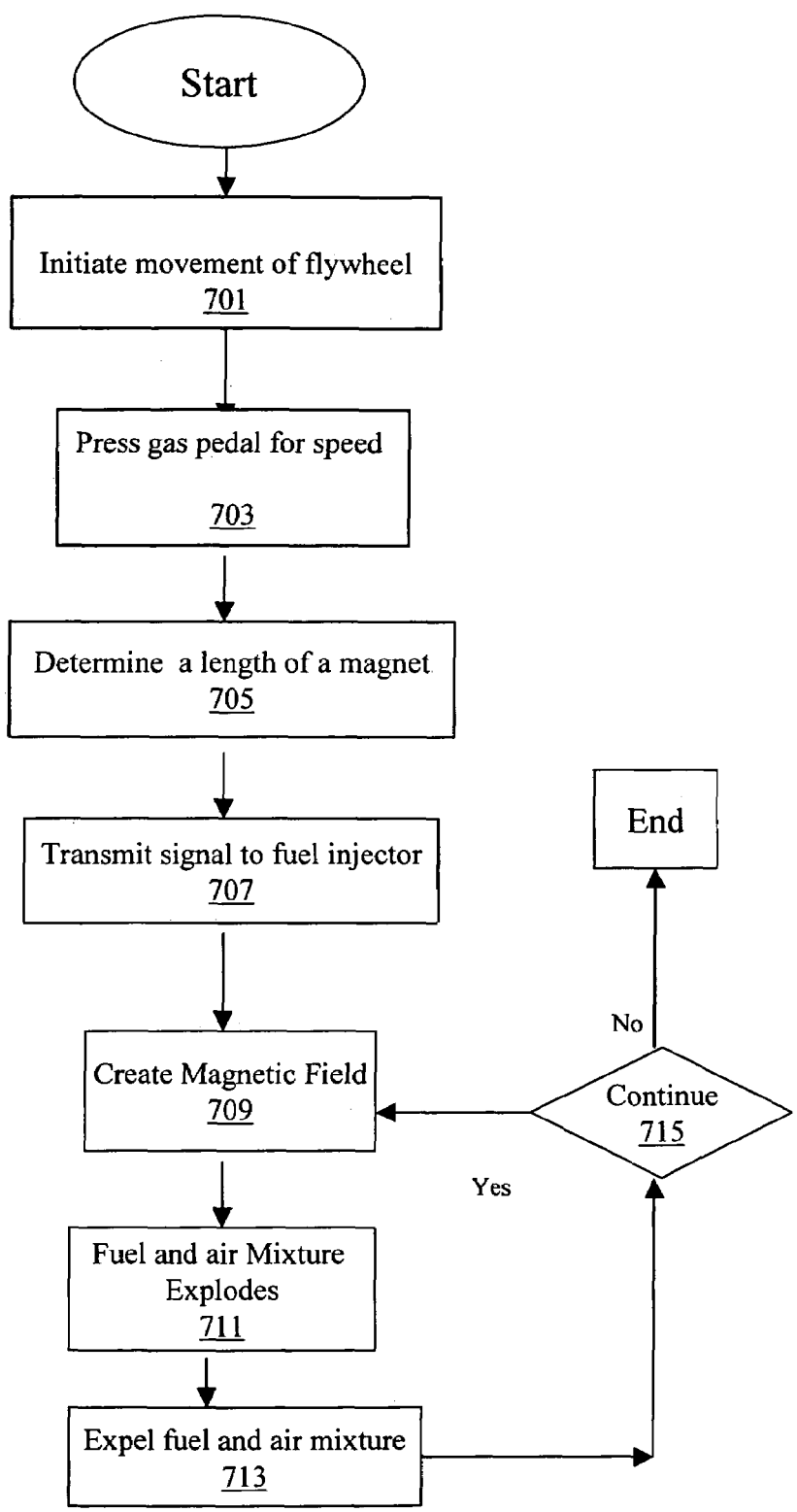
FIG. 7 is a flow chart that depicts a method of how the fuel injection system in a small vehicle of FIG. 5 is employed in accordance with the embodiment of the invention.

FIG. 6 shows a flow chart that depicts a method of how the fuel injection is employed in the flywheel magneto generator system, which is utilized in a lawn mower and devices associated with FIGS. 3 and 4. The operation of this flywheel magneto generator system in a lawn mower is equivalent to the operation of a flywheel magneto generator system of small four cycle engines including some riding lawnmowers, tillers, snow blowers, small generators or series hybrid devices. For some riding lawnmowers of vehicles with 1 or 2 cylinder engines, 1 magnetic sensor may be utilized. For other types of riding lawn mowers or vehicles with 2 cylinder engines, 4 cylinder engines, 6 cylinder engines, and 8 cylinder engines then 2 magnetic sensors are utilized in place of 1 magnetic sensor as shown in FIGS. 5 and 7.

At block 601, a person pulls the pull connector 111 or switch to initialize movement of the flywheel 202. The flywheel 202 starts to rotate around the bolt 204 of the engine 201 (FIG. 3). As the flywheel 202 rotates around the bolt 204, at block 603 the person presses low speed switch 302a, medium speed switch 302b or high speed switch 303c to choose a speed the lawn mower 101 (FIG. 1) will operate. When any of the aforementioned switches are pressed, a signal is transmitted from the throttle control sensor 310a to the throttle plate 310b to keep an air flap of the throttle plate 310b closed or open the air flap of the throttle plate 310b. For example, when the throttle control sensor 310a is activated by the low speed switch 302a, then the throttle plate 310b will be closed so air will not flow to the throttle body 310 and the intake valve 311. However, when the throttle control sensor 310a is activated by a person pressing the medium speed switch 302b then throttle control sensor 310a instructs the throttle plate 310b to open up its air flap to about 10 to 20 degrees to allow air to flow to the throttle body 310 and intake valve 311. Preferably, the air flap of the throttle plate 310b will open up to about 10 degrees. In another example, when the throttle control sensor 310a is activated by a high speed switch 302c then the throttle control sensor 310a instructs the throttle plate 310b to open up its air flap up to about 10-20 percent to allow air to flow to the throttle body 310 and intake valve 311. Preferably, the air flap of the throttle plate 310b will be opened to about 20 degrees.

Next, at block 605 when either the low speed switch 302a, medium speed switch 302b or high speed switch 302c is pressed, then the throttle control sensor 310a, through a connection (hard-wired or wireless) with the magnetic sensor 303a, magnetic sensor 303b or magnetic sensor 303c, instructs the magnetic sensor 303a, magnetic sensor 303b or magnetic sensor 303c to determine if a magnet 208 is on the flywheel 202. In another embodiment, magnet 208 is replaced with magnet 229 (FIG. 4). If the magnetic sensors 303a, 303b and 303c determine that there is no magnet 208 on flywheel 202 then the process ends. If there is a magnet 208 on flywheel 202, then at block 607, the processor of the throttle control sensor 310a informs the magnetic sensor 303a, magnetic sensor 303b or magnetic sensor 303c how much of the length of the magnet 208 should be determined based on the switch pressed by the person either low speed switch 302a, medium speed switch 302b or high speed switch 302c. For example, if the person presses the low speed switch 302a then the throttle control sensor 310a instructs the magnetic sensor 303a to sense a $\frac{1}{8}^{th}$ inch of the magnet 208. If the person presses the medium speed switch 302b, then the throttle control sensor 310a instructs the magnetic sensors 303a and 303b to sense a $\frac{2}{8}^{th}$ inch of the magnet 208. Next, if the person presses the high speed switch 302c then the throttle control sensor 310a instructs the magnetic sensors 303a, 303b and 303c to sense a $\frac{3}{8}^{th}$ inch of the magnet 208.

Next, at block 609 the magnetic sensor 303a, magnetic sensor 303b or magnetic sensor 303c sends a signal or electrical current through a hard-wired or wireless connection to the fuel injector 307 to open its nozzle to disperse or spray fuel into a throttle body 310 and intake valve 311 based on if the magnetic sensor 303a detects the $\frac{1}{8}^{th}$ inch of the magnet 208, magnetic sensors 303a and 303b detect the $\frac{2}{8}^{th}$ inch of the magnet 208, or magnetic sensors 303a, 303b and 303c detect the $\frac{3}{8}^{th}$ inch of the magnet 208. The fuel from the fuel injector 307 is based on the pulse width formula in the processor of the throttle control sensor 310a. This pulse width (PW) formula, equation or software program in the processor of the throttle control sensor 310a operates as follows:

$$PW = 5 \text{ to } 85\% \text{ duty cycle}/((\text{Rpm of flywheel } 202/60) \times 10)$$

The duty cycle is between 5 to 85% is the percentage of the fuel injector 307 that stays open to spray fuel onto the intake valve when the engine 201 is running. The Rpm is the revolutions per minute the flywheel 202 is rotating around the block 204. The numerical value 60 is hertz which is a figure used for this batch fuel injection system and 10 is a constant for this formula. For each speed, such as low speed 302a, medium speed 302b and high speed 302c, a pulse width is determined. Pulse width, as stated above, is a measurement of time usually in milliseconds that fuel will be dispersed by the fuel injector 307 onto the intake valve 311. For example, for low speed 302a the duty cycle is 5, which is divided by the 2000 rpm that is divided by 60 and multiplied by 10 to produce 15 milliseconds of which fuel will be sprayed by the fuel injector 307 onto the intake valve 311. The range for revolutions per minute for low speed 302a is in the range of about 1000-3000. For example, for the medium speed 302b the duty cycle will be 10, which is divided by the 3000 rpm that is divided by 60 and multiplied by 10 to produce 20 milliseconds of which fuel will be sprayed by the fuel injector 307 onto the intake valve 311. The range for revolutions per minute for medium speed is in the range of 3000-4000 rpm and duty cycle is in the range of 10 to 15. For example, for the high speed 302c, the duty cycle is 15, which is divided by the 4000 rpm that is divided by 60 and multiplied by 10 to produce 22 milliseconds of which fuel will be sprayed by the fuel injector 307 onto the intake valve 311. The range for revolutions per minute for medium speed is in the range of 4000-4500 rpm and duty cycle is in the range of 15 to 25. When the fuel is injected by the fuel injector 307 into the throttle body 310 and onto the intake valve 311, then the fuel mixes with the air (gasoline) flowing through the air flap of the throttle plate 310b depending on if the low speed switch 302a, medium speed switch 302b or high speed switch 302c is pressed.

At block 611, the flywheel 202 rotates around the block 204 and the partially covered magnet 229 brushes against magneto 209, coil 211, coil 213, coil 215, coil 217 and coil 221 creating a magnetic field. When this magnetic field is created between the magnet 229, magneto 209, coil 211, coil 213, coil 215, coil 217 and coil 221 an electrical current is sent from the magneto 209, coil 211, coil 213, coil 215, coil 217 and coil 221 to the spark plug 309 to excite it. When the spark plug 309 is excited it emits a spark to ignite the fuel and air (gasoline) mixture in the intake valve 311 while the piston 315 is in close proximity to the intake valve 311. The fuel and air mixture is caused to explode by the spark from the spark plug 309 at block 613, which causes the piston 315, as in a typical combustion engine, to move. When the piston 315 begins to move the crankshaft 305 moves with the blade 317, which causes the lawn mower 101 to operate. At block 615, when the amount of gasoline decreases the piston 315 begins to stop moving, then the exhaust valve 313 opens and expels the fuel air mixture through the exhaust valve 313. At block 617, the person may decide to stop the operation of the lawn mower 101 by pressing a STOP button (not shown) on the lawn mower and the process will end or the process will automatically continue at block 609.

FIG. 7 shows a flow chart that depicts how the fuel injection system is employed in a go-cart, small tractor, some riding lawnmowers and small vehicles or an automobile of FIG. 5. At block 701, a person sits down inside a go-cart, riding lawn mower, vehicle or an automobile and turns the ignition switch (FIG. 5) ON to produce a high voltage electrical charge that is transmitted to the spark plugs 517a, 517b, 517c and 517d (FIG. 5) and initializes movement of the crankshaft pulley 513. After the ignition switch is turned ON, the crankshaft pulley 513 starts to rotate around the bolt 531 of the engine 501. As the crankshaft pulley 511 rotates around the bolt 531, at block 703 the person presses the gas pedal 517 to gradually increase the speed of the go-cart. When the gas pedal 517 is pressed an electrical signal is sent by electrical cable 518 to the potentiometers 521a and 521b, which transmits a signal to the throttle plate 523 to keep the air flap of the throttle plate 523 closed or open the air flap of the throttle plate 523. (FIG. 5) The opening of the throttle plate 523 is in the range of about 0 to 120 degrees, which is in direct relation to the duty cycle of 5 to 85% for the pulse width formula described in FIG. 5. For example if the person does not press the gas pedal 517, when the engine is idle, the potentiometers 521a and 521b transmits a signal to the throttle plate 523 to keep it closed. The throttle plate will have a 0 degree of opening and a duty cycle of 5 will be utilized in the pulse width formula in a processor of potentiometers 527a and 527b. When the low speed is selected by a person slightly pressing the gas pedal 517, the potentiometers 521a and 521b receives a signal by cable 518 from the gas pedal 517, which is then transmitted to the throttle plate 523 to open the throttle plate 523b to about 10 to 20 degrees. The throttle plate 523 will be opened in a range of about 10 to 20 degrees and a duty cycle of 20 to 40 will be utilized in the pulse width formula in a processor of potentiometers 521a and 521b. For medium speed, the person would mid way press the gas pedal 517, then the potentiometers 527a and 527b receives a signal by cable 518 from the gas pedal 517, which is then transmitted to the throttle plate 523 to open the throttle plate 523 in a range of about 10-20 degrees. The throttle plate 523 will be opened in a range of about 10 to 20 degrees and a duty cycle of 20 to 40 will be utilized in the pulse width formula in a processor of potentiometers 521a and 521b. For high speed, the person would fully press the gas pedal 517, then the potentiometers 521a and 521b receives a signal by cable 518 from the gas pedal 517, which is then transmitted to the throttle plate 523 to open the throttle plate 523 to open the throttle plate 523 in a range of about 10-20 degrees. The throttle plate 523 will be opened in a range of about 10-20 degree of opening and a duty cycle in a range of about 20-40 will be utilized in the pulse width formula in a processor of potentiometers 521a and 521b.

Next, at block 705 when the gas pedal 517 is pressed, the processor of the potentiometers 521a and 521b through the typical (hard-wired or wireless) connection with the magnetic sensors 527a and 527b informs the magnetic sensors 527a and 527b how much of the length of the magnet 529 should be determined based on how much the gas pedal 517 is not pressed or pressed. For example if the person does not press the gas pedal 517, when the engine is idle, the potentiometers 521a and 521b transmits a signal through a hard-wireless connection to activate the magnetic sensors 527a and 527b. In another example, if the person slightly presses the gas pedal 517, then the potentiometers 521a and 521b instructs the magnetic sensors 527a and 527b to sense a $\frac{1}{8}^{th}$ inch of the magnet 529. If the person mid way presses the gas pedal 517, then the potentiometers 521a and 521b instructs the magnetic sensor 527a and 527b to sense a $\frac{2}{8}^{th}$ inch of the magnet 529. Next, if the person fully presses the gas pedal 517, then the potentiometers 521a and 521b instructs the magnetic sensors 527a and 527b to sense a $\frac{3}{8}^{th}$ inch of the magnet 529.

Next, at block 707 the magnetic sensors 527a and 527b transmits a signal or electrical current through a hard-wired or wireless connection to the respective fuel injectors 503a, 503b, 503c and 503d (FIG. 5) to open its nozzle to disperse or spray fuel into a throttle body 525 and intake port 507 based on if the magnetic sensors 527a and 527b detects the $\frac{1}{8}^{th}$ inch of the magnet 529, $\frac{2}{8}^{th}$ inch of the magnet 529 or $\frac{3}{8}^{th}$ inch of the magnet 529. Also, the potentiometers 521a and 521*b* utilized its processors and respective fuel injectors 503*a*, 503*b*, 503*c* and 503*d* to disperse fuel into the intake port based on the pulse width formula described above. Potentiometer 521*a* utilizes its processor with magnetic sensor 527*a* to disperse fuel from the fuel injectors 503*a* and 503*d* into the intake port 507. Potentiometer 521*b* utilizes its processor with magnetic sensor 527*b* to disperse fuel from the fuel injectors 503*b* and 503*c* into the intake port 507. For example, when a person lightly touches the gas pedal 517 the duty cycle is 5, which is divided by the 2000 rpm that is divided by 60 and multiplied by 10 to produce 15 milliseconds of which fuel will be sprayed by the fuel injectors 503*a* and 503*d* into the intake port 507. When the fuel injectors 503*a* and 503*d* stops spraying fuel into the intake port 507, then the fuel injectors 503*b* and 503*c* will spray fuel for 15 milliseconds into the intake port 507. The range for revolutions per minute for the crankshaft pulley 513 is in the range of about 1000-3000. For example, for the person mid way pressing the gas pedal 517 the duty cycle will be about 20, which is divided by the 3000 rpm that is divided by 60 and multiplied by 10 to produce 40 milliseconds of which fuel will be sprayed by the fuel injector 503*a* and 503*d* into the intake port 507. When the fuel injectors 503*a* and 503*d* stop spraying fuel into the intake port 507, then the fuel injectors 503*b* and 503*c* will spray fuel for 40 milliseconds into the intake port 507. The range for revolutions per minute for the crankshaft pulley 513 at medium speed is in the range of 3000-4000 rpm and duty cycle is in the range of 5 to 85 or 5 to 85% depending on the opening of throttle plate 523. For example, when the gas pedal 517 is fully pressed the duty cycle may be 25, which is divided by the 4000 rpm that is divided by 60 and multiplied by 10 to produce 37.5 milliseconds of which fuel will be sprayed by the fuel injectors 503*a* and 503*d* into the intake port 307. When the fuel injectors 503*a* and 503*d* stop spraying fuel into the intake port 507, then the fuel injectors 503*b* and 503*c* will spray fuel for 37.5 milliseconds into the intake port 507. The range for revolutions per minute for medium speed is in the range of 4000-4500 rpm and duty cycle is in the range of 5 to 85%. When the fuel is injected by the respective fuel injectors 503*a*, 503*b*, 503*c* and 503*d* into the throttle body 525 and into the intake port 507, then the fuel mixes with the air (gasoline) flowing through the air flap of the throttle plate 523 depending on how much the person presses the gas pedal 517.

At block 709, as the crankshaft pulley 513 rotates around the bolt 531 the spark plugs 517*a*, 517*b*, 517*c* and 517*d* receive a high voltage electrical charge from the distribution cap (not shown), ignition coil (not shown) and the ignition wire. When the spark plugs 517*a*, 517*b* 517*c* and 517*d* received the high-voltage electrical charge the spark plugs 517*a*, 517*b*, 517*c* and 517*d* are excited and emit a spark to ignite the fuel and air (gasoline) mixture in the intake port 507. The respective pistons 511*a*, 511*b*, 511*c* and 511*d* move back up to compress the fuel/air mixture in a compression making the explosion more powerful. At block 711, when the pistons 511*a*, 511*b* and 511*c* and 511*d* reach the top of its stroke or close to top dead center then the spark plugs 517*a*, 517*b*, 517*c* and 517*d* emits a spark to ignite the fuel/air mixture (gasoline), then the fuel and air mixture explodes, which causes the pistons 511*a*, 511*b*, 511*c* and 511*d*, as in a typical combustion engine, to move in a typical horizontal manner of back and forth or a typical vertical manner of up and down depending on the application. When the pistons 511*a*, 511*b*, 511*c* and 511*d* begins to move, then the crankshaft pulley 513 moves with a typical transmission (not shown) and a typical belt (not shown) Crankshaft pulley 513 is connected by a cable or the typical mechanical connection means utilized in vehicles to the typical transmission. Transmission is connected by a cable or the typical mechanical connection used in vehicles to the typical belt. The typical belt is connected by a cable or the typical mechanical connection used in vehicles to wheels (not shown) of the vehicle. The movement of the belt causes the wheels of the go-cart or small tractor to move. At block 713, the pistons 511*a*, 511*b*, 511*c* and 511*d* hits the bottom of its stroke, the exhaust port 508 opens and exhaust leaves through a typical tail pipe (not shown) of the go-cart. The pistons 511*a*, 511*b*, 511*c* and 511*d* begin to stop moving because the gasoline mixture has decreased.

At block 715, the person may decide to stop the operation of the go-cart by pressing a STOP button (not shown) on the go-cart or turning the ignition switch to the OFF position and the process will end or the process will automatically continue at block 709.

This invention provides a simple means to initiate the movement of a vehicle by utilizing a fuel injector system, which determines a length of a magnet on the flywheel or crankshaft pulley. This system enables a person to choose a speed where fuel from a fuel injector can be efficiently dispersed into an engine. The engine's fuel efficiency is optimized by this invention, because only a specific amount of fuel will be dispersed to generate electricity to operate the engine, which prevents the engine from needlessly expending energy.

It is intended that the foregoing detailed description be regarded as illustrative rather than limiting and that it be understood that it is the following claims, including all equivalents, which are intended to define the scope of the invention.

The invention claimed is:

1. A system for utilizing a fuel injection system comprising:
   a coverplate coupled to a pull connector;
   a flywheel disposed beneath the cover plate, wherein the flywheel is connected to the pull connector, wherein the pull connector is configured to initiate movement of the flywheel;
   a first magnet coupled to the flywheel;
   a first magnetic sensor coupled to the coverplate, wherein the first magnetic sensor is configured to determine a length of the first magnet on the flywheel;
   a fuel injector coupled to the first magnetic sensor; and
   wherein the first magnetic sensor is configured to transmit a first signal to the fuel injector responsive to the first magnetic sensor determining the length of the first magnet on the flywheel.

2. The system of claim 1, further comprising:
   a second magnetic sensor and a third magnetic sensor coupled to the cover plate, wherein the second magnetic sensor and the third magnetic sensor are configured to determine the length of the first magnet on the flywheel;
   the fuel injector coupled to the second magnetic sensor and third magnetic sensor;
   wherein the second magnetic sensor and the third magnetic sensor are configured to respectively transmit a second signal and a third signal to the fuel injector responsive to the second magnetic sensor and the third magnetic sensor determining the length of the first magnet on the flywheel.

3. The system of claim 2, wherein the fuel injector is coupled to a throttle body.

4. The system of claim 3, wherein the throttle control sensor is coupled to the throttle body.

5. The system of claim 4, wherein the fuel injector and throttle body are connected to an intake valve.

6. The system of claim 5, wherein the fuel injector is configured to disperse fuel into the throttle body and the intake valve.

7. The system of claim 6, wherein the throttle control sensor is connected to an air flow mechanism that controls air entering into the throttle body and the intake valve.

8. The system of claim 7, wherein the air flow mechanism is a throttle plate that includes an air flap for allowing air into the throttle body and the intake valve.

9. The system of claim 8, wherein a low speed switch, a medium speed switch and a high speed switch are coupled to the cover plate and the throttle control sensor.

10. The system of claim 9, wherein the throttle plate is configured to not allow air into the throttle body and the intake valve in response to the low speed switch being pressed and the first magnetic sensor determining the length of the first magnet.

11. The system of claim 9, wherein the throttle plate is configured to allow air to flow into the throttle body and the intake valve in response to the medium speed switch being pressed and the first magnetic sensor and the second magnetic sensor determining the length of the first magnet.

12. The system of claim 9, wherein the throttle plate is configured to allow air to flow into the throttle body and the intake valve in response to the high speed switch being pressed and the first magnetic sensor, the second magnetic sensor and the third magnetic sensor determining the length of the first magnet.

13. The system of claim 8, wherein fuel is dispersed from the fuel injector based on a pulse width software equation in a processor of the throttle control sensor:

Pulse Width=duty cycle/((Revolutions per minute/60)×10)

where pulse width is a length of time that the fuel will be dispersed by the fuel injector, where duty cycle is a percentage a nozzle of the fuel injector stays open to spray fuel onto the intake valve, where revolutions per minute is a number of revolutions the flywheel is rotating, where 60 is hertz a numerical value used for a batch fuel injection system and where 10 is a constant.

14. The system of claim 13, wherein revolutions per minute is in a range of about 1000-4500 rpm.

15. The system of claim 13, wherein duty cycle is in a range of about 5 to 85%.

16. A system for utilizing a fuel injection system comprising:
a coverplate coupled to an ignition switch;
a flywheel disposed below the cover plate, wherein the flywheel is connected to the ignition switch, wherein the ignition switch is configured to initiate movement of the flywheel;
a magnet coupled to the flywheel;
a magnetic sensor coupled to the coverplate, wherein the magnetic sensor is configured to determine a length of the magnet on the flywheel as the flywheel initiates movement;
a fuel injector operatively connected to the magnetic sensor;
wherein the magnetic sensor is configured to transmit an electrical current to the fuel injector in response to the magnetic sensor determining the length of the magnet on the flywheel;
a throttle body coupled to the fuel injector; and
wherein the fuel injector is configured to disperse fuel into the throttle body based on the magnetic sensor determining the length of the magnet on the flywheel.

17. A system utilizing a fuel injection system comprising:
a crankshaft pulley coupled to an ignition switch, where the ignition switch is configured to initiate movement of the crankshaft pulley;
a magnet coupled to the crankshaft pulley;
a camshaft disposed above the crankshaft pulley;
a first magnetic sensor coupled to a crankshaft coverplate disposed above the crankshaft pulley;
the first potentiometer coupled to the first magnetic sensor;
wherein the first magnetic sensor is configured to determine a first length of the magnet on the crankshaft pulley as the crankshaft pulley initiates movement;
the second potentiometer coupled to a second magnetic sensor;
the second magnetic sensor coupled to the crankshaft coverplate disposed above the crankshaft pulley, wherein the second magnetic sensor is configured to determine a second length of the magnet on the crankshaft pulley as the crankshaft pulley initiates movement;
a first fuel injector and a second fuel injector operatively connected to the first magnetic sensor;
a third fuel injector and a fourth fuel injector operatively connected to the second magnetic sensor;
wherein the first magnetic sensor is configured to transmit an electrical signal to a first fuel injector and the second fuel injector in response to the magnetic sensor determining the length of the magnet on the crankshaft pulley;
wherein the first magnetic sensor is configured to transmit an electrical signal to the first fuel injector and the second fuel injector in response to the first magnetic sensor determining the first length of the magnet on the crankshaft pulley;
a throttle body coupled to the first fuel injector, the second fuel injector, the third fuel injector and the fourth fuel injector;
an intake port located next to the first fuel injector, second fuel injector, third fuel injector and fourth fuel injector; and
wherein the first fuel injector and the second fuel injector are configured to disperse fuel into the intake port based on the first magnetic sensor determining the length of the magnet on the crankshaft pulley.

18. The system of claim 17, wherein the third fuel injector and the fourth fuel injector are configured to disperse fuel into the intake port based on the second magnetic sensor determining the second length of the magnet on the crankshaft pulley.

19. The system of claim 18, further comprising a gas pedal coupled to the first potentiometer and second potentiometer, wherein the first potentiometer and the second potentiometer transmits a first electrical signal and a second electrical signal respectively to the first magnetic sensor and the second magnetic sensor in order to determine the first length and the second length of the magnet.

* * * * *